(Model.)

J. MOSSMAN.
HAME AND COLLAR COUPLER.

No. 251,917. Patented Jan. 3, 1882.

Witnesses
P. B. Turpin
G. A. Digges

Inventor
James Mossman
By R. S. & A. P. Lacey
Att'ys

UNITED STATES PATENT OFFICE.

JAMES MOSSMAN, OF WESTERVILLE, ASSIGNOR OF ONE-HALF TO HARNELL L. BENNETT, OF HARLEM, OHIO.

HAME AND COLLAR COUPLER.

SPECIFICATION forming part of Letters Patent No. 251,917, dated January 3, 1882.

Application filed November 10, 1881. (Model.)

*To all whom it may concern:*

Be it known that I, JAMES MOSSMAN, a citizen of the United States, residing at Westerville, in the county of Franklin and State of Ohio, have invented certain new and useful Improvements in Hame and Collar Couplers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to provide an improved coupling for hames and horse-collars, so as to fasten or couple both hames and collar at the bottom around the horse's neck by one operation with the one coupler; and it consists in the construction and arrangement of several parts hereinafter described, and pointed out in the claim.

Figure 1:
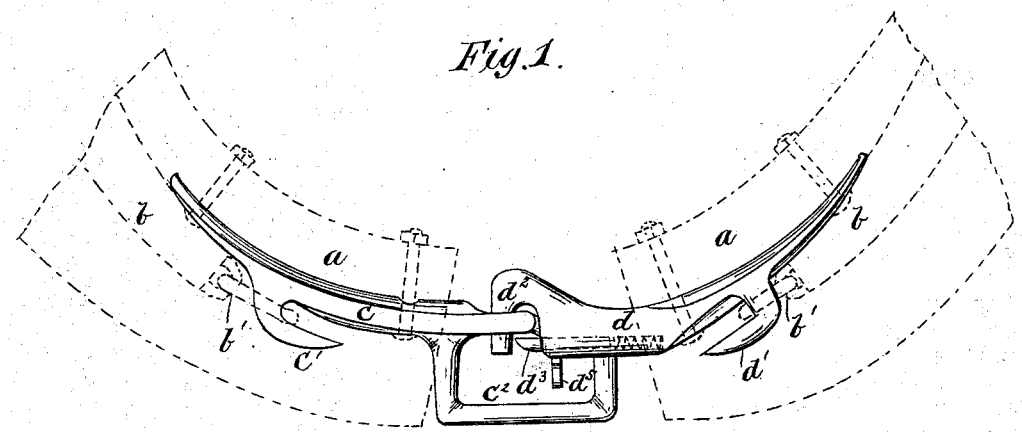
Figure 2:
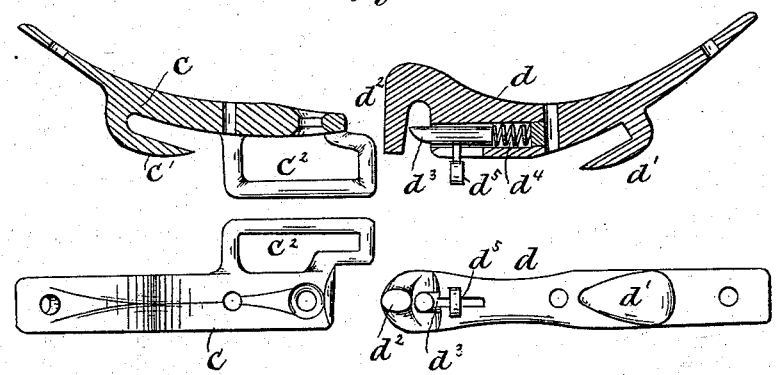

In the drawings, Figure 1 is a front view of my device, showing it in connection with collar and hames; and Fig. 2 shows the coupler in detail.

$a$ is a horse-collar, open at the bottom, as shown.

$b\ b$ are the hames, having on their lower ends the hame-strap rings $b'\ b'$, adapted to catch over the hooks of coupling-bars and secure the hames in proper position in the hollow of the collar, as will be hereinafter described.

$c\ d$ are the coupling-bars, placed in the hollow of the opposite ends of the collar and securely bolted thereto, as shown. The bar $c$ is provided with hook $c'$ near its upper end, and has through its lower end an opening to form an eye to receive the hook on end of bar $d$, as hereinafter described.

$c^2$ is a loop arranged in proper position on bar $c$ to receive the choke-strap.

The bar $d$ is provided near its upper end with hook $d'$, and its lower end is curved to form the hook $d^2$, as shown.

$d^3$ is a fastening-bolt placed in a socket in the bar $d$, and supported out against the hook $d^2$ by coil-spring $d^4$, placed in the socket in the rear of the bolt $d^3$, and bearing between the end of the bolt and the end of the socket in which the spring is placed. This bolt $d^3$ is beveled at its outer end, so the eye on bar $c$ may be forced by it or snapped into the hook $d^2$, as shown.

$d^5$ is a thumb-piece connected to bolt $d^3$, and extending up through and operating in slot in the side of bar $d$. By this thumb-piece the bolt $d^3$ can be pressed back in its socket and the bar $c$ released from the bar $d$ when desired.

The operation of my device is readily understood by reference to the drawings. The hames are placed over the collar and secured by passing the hame-strap rings $b'\ b'$ over the hooks $c'\ d'$ of the coupling-bars. The ends of the collar and coupler are then brought together, and the hook on bar $d$ is pressed into the opening in bar $c$. The fastening-bolt of hook $d^2$ being beveled, the hook is self-acting, and the bolt will be forced back when the ring around opening in bar $c$ is forced against the beveled end of bolt $d^3$.

This device has many advantages over the hames and collar in ordinary use by having the collar open at the bottom, and by doing away with hame-strap and having coupler and hames always fastened on the collar. They are both together thrown over the horse's neck and coupled at the bottom at one operation by the self-acting coupler in much less time than it can be done in the ordinary way, and it enables a lady or child to readily perform the work, who could not possibly harness a horse in the ordinary way—namely, removing the halter and forcing the collar upside down over the horse's head and turning it on the neck, and then placing the hames over the collar and fastening them with hame-straps. It also has the same advantage over the ordinary way of putting the collar on the horse by unbuckling it at the top and removing the pad and putting the collar on the neck and holding it up while the pad is replaced and fastened by buckles on two straps at top of the neck.

This device may be used in connection with the ordinary hames and collars now in use by cutting the collar open at the bottom and properly securing the ends and bolting the coupling-bars to the collar on opposite sides of the opening formed, and attaching the hames to the coupling-bars, as hereinbefore set forth.

This invention may also be used in the manufacturing of new hames by the hames being molded or cast with the coupling-bars on their lower ends, the hames so formed being then secured to the collar that is open at the bottom, and then they are ready to couple together at the bottom, as hereinbefore described. In case of new hames of this construction the hooks $c'$ $d'$ would not be necessary.

Having thus described my invention, what I claim, and desire to secure by Letters Patent, is—

A collar or hame coupler composed of the section $c$, provided with hook $c'$ and martingale-loop, and having formed in its lower end the eye or loop to receive the hook on section $d$, and section $d$, provided with hame-hook and formed at its lower end with hook $d^2$, and having formed in it nearly opposite the end of the hook $d^2$ a longitudinal socket, in which is placed the bolt $d^3$, beveled at its outer end and provided with thumb-piece $d^5$, and a spring arranged in the socket to bear between base of socket and rear end of bolt and hold the same out against the end of hook, the said bolt being arranged to bear against the end of hook and secure the eye on section $e$ in the loop thereby formed on section $d$, substantially as set forth.

In testimony whereof I affix my signature in presence of two witnesses on this 8th day of November, 1881.

JAMES MOSSMAN.

Witnesses:
 ISAAC N. CUSTER,
 G. W. HAYNES.